United States Patent
Nonaka

(10) Patent No.: US 8,917,316 B2
(45) Date of Patent: Dec. 23, 2014

(54) PHOTOGRAPHING EQUIPMENT

(75) Inventor: Osamu Nonaka, Kanagawa (JP)

(73) Assignee: Olympus Imaging Corp., Tokyo (JP)

( * ) Notice: Subject to any disclaimer, the term of this patent is extended or adjusted under 35 U.S.C. 154(b) by 374 days.

(21) Appl. No.: 13/280,009

(22) Filed: Oct. 24, 2011

(65) Prior Publication Data

US 2012/0098936 A1 Apr. 26, 2012

(30) Foreign Application Priority Data

Oct. 25, 2010 (JP) ................................ 2010-238801

(51) Int. Cl.
*H04N 13/02* (2006.01)
*H04N 5/232* (2006.01)
*H04N 13/00* (2006.01)

(52) U.S. Cl.
CPC ....... *H04N 13/0296* (2013.01); *H04N 5/23293* (2013.01); *H04N 2013/0081* (2013.01)
USPC ........................................... 348/46; 382/154

(58) Field of Classification Search
CPC ....... G06T 7/0065; G06T 15/04; G06T 17/10; G06T 17/00; G06T 7/0071; G06T 7/0075; G06T 2207/10012; G06T 7/0022; G06K 9/36; H04N 13/0239; H04N 13/0055; H04N 13/0296; H04N 13/0497; H04N 13/0242; H04N 13/02; H04N 2013/0081
USPC ......... 348/43, 46, 47, 50, 135–142, 148–151, 348/170, 191; 382/154, 285
See application file for complete search history.

(56) References Cited

U.S. PATENT DOCUMENTS

| | | | |
|---|---|---|---|
| 7,106,365 B1 * | 9/2006 | Sogawa ..................... | 348/222.1 |
| 8,350,847 B2 * | 1/2013 | Shpunt ....................... | 345/419 |
| 2005/0151839 A1 * | 7/2005 | Ito et al. ........................ | 348/51 |
| 2008/0106746 A1 * | 5/2008 | Shpunt et al. ................. | 356/610 |
| 2008/0199046 A1 * | 8/2008 | Sasagawa et al. ............ | 382/106 |
| 2008/0240502 A1 * | 10/2008 | Freedman et al. ............ | 382/103 |
| 2009/0116732 A1 * | 5/2009 | Zhou et al. ..................... | 382/154 |
| 2010/0007717 A1 * | 1/2010 | Spektor et al. ................. | 348/43 |
| 2010/0085423 A1 * | 4/2010 | Lange ............................ | 348/46 |
| 2010/0232727 A1 * | 9/2010 | Engedal ........................ | 382/285 |
| 2010/0284607 A1 * | 11/2010 | Van Den Hengel et al. .. | 382/154 |
| 2011/0211045 A1 * | 9/2011 | Bollano et al. ................. | 348/46 |
| 2012/0243774 A1 * | 9/2012 | Chen et al. .................... | 382/154 |

FOREIGN PATENT DOCUMENTS

| | | |
|---|---|---|
| JP | 2004-348155 | 12/2004 |
| JP | 2007-504511 | 3/2007 |
| JP | 2008-205758 | 9/2008 |
| WO | WO 2005/025239 | 3/2005 |

OTHER PUBLICATIONS

Office Action for corresponding Japanese Patent Application Serial No. 2010-238801, mailed Apr. 22, 2014 (2 pgs.).

* cited by examiner

*Primary Examiner* — Dave Czekaj
*Assistant Examiner* — Dramos I Kalapodas
(74) *Attorney, Agent, or Firm* — John C. Pokotylo; Straub & Pokotylo

(57) ABSTRACT

Photographing equipment includes an image pickup portion, a display portion which displays an image acquired by the image pickup portion, an object detecting portion which detects a reference object of a predetermined size or a larger size within an image pickup range of the image pickup portion among objects in the image acquired by the image pickup portion, and a display controlling portion which displays a representation recommending 3D photographing on the display portion if the object detecting portion detects the reference object.

20 Claims, 11 Drawing Sheets

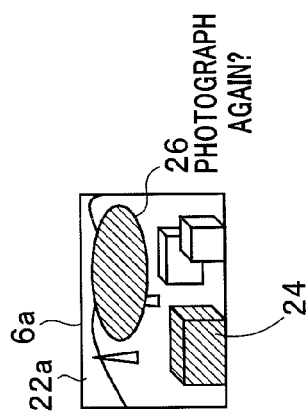
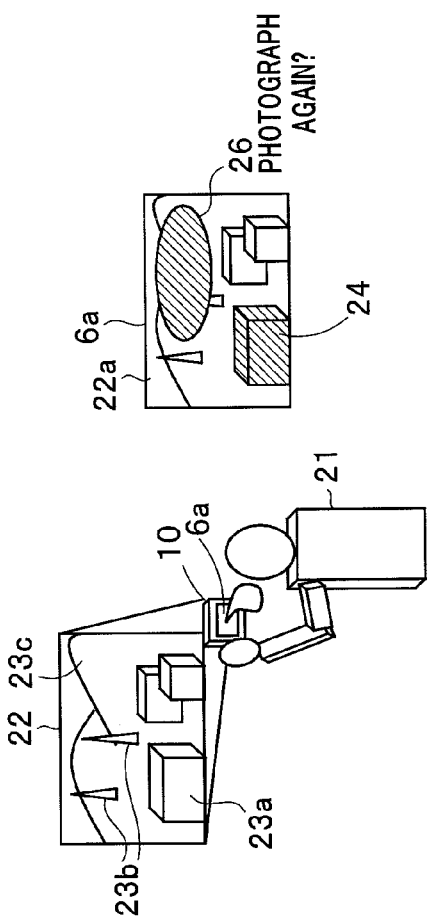
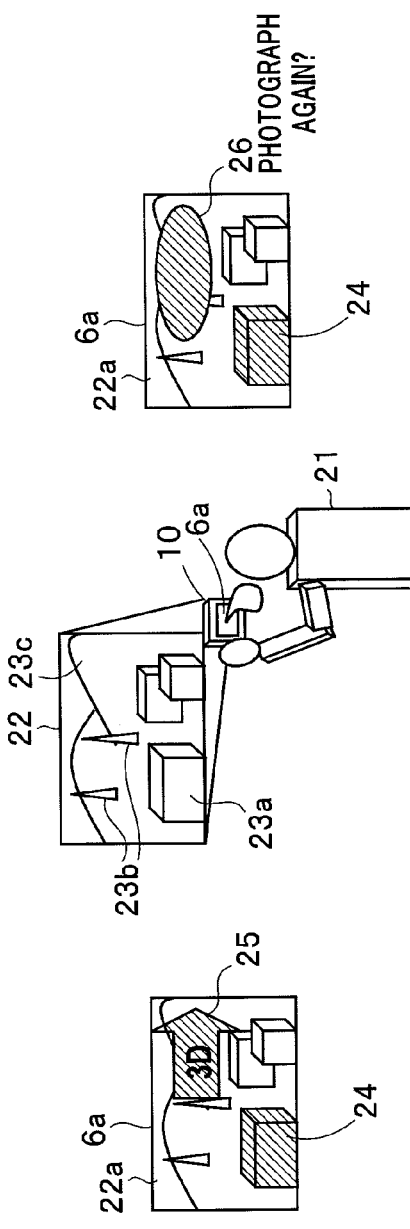
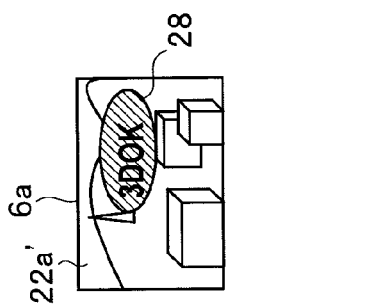
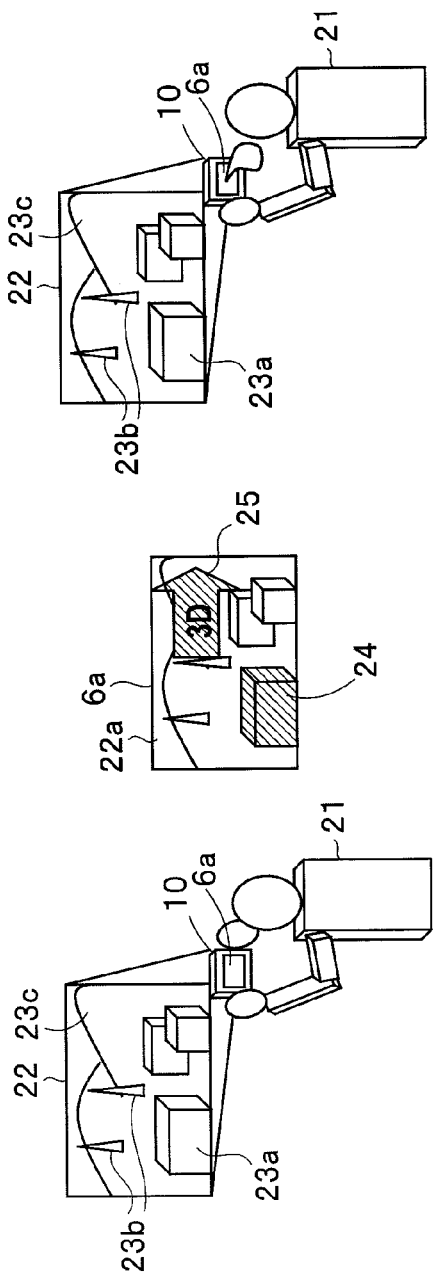
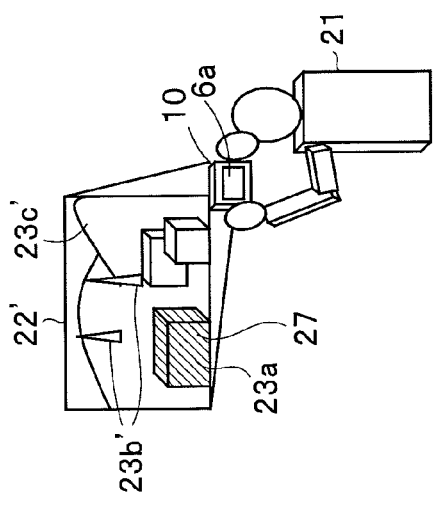

FIG. 7A
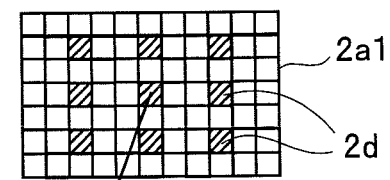
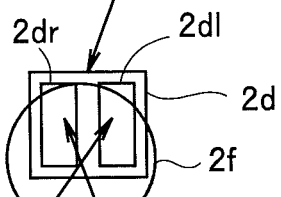
FIG. 7B
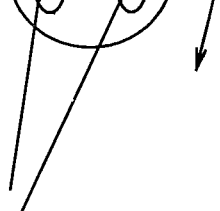
FIG. 8
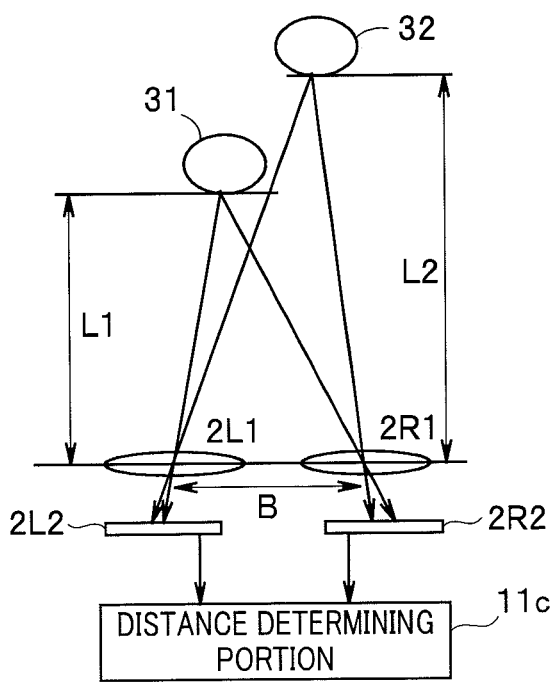

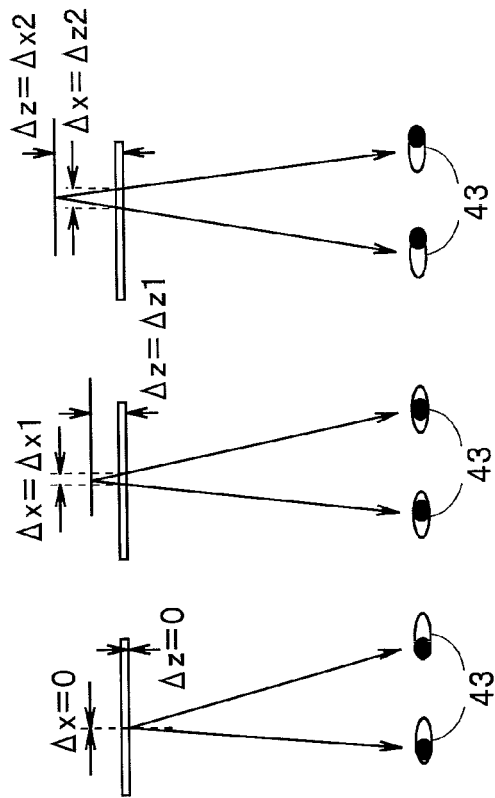
FIG. 10C
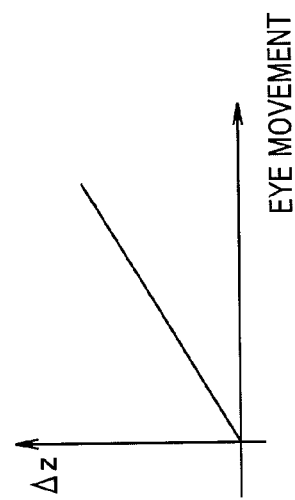
FIG. 10D
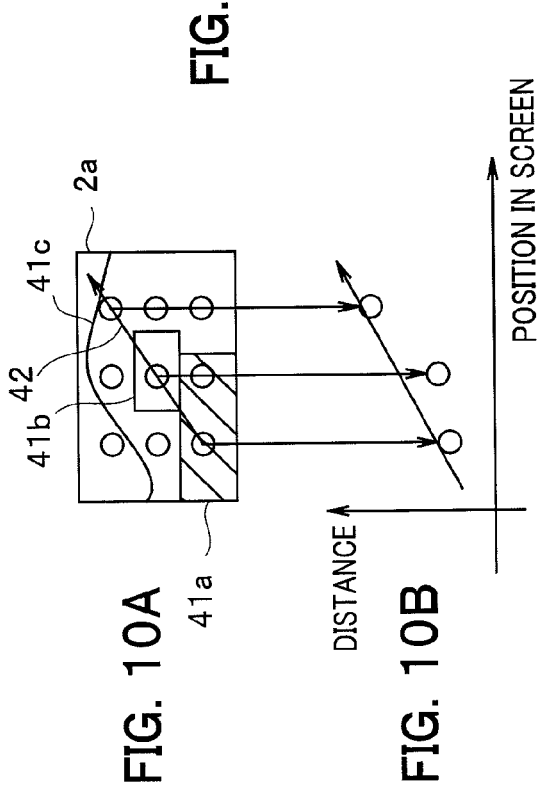
FIG. 10A
FIG. 10B

PHOTOGRAPHING EQUIPMENT

CROSS REFERENCE TO RELATED APPLICATION

This application claims benefit of Japanese Application No. 2010-238801 filed in Japan on Oct. 25, 2010, the contents of which are incorporated by this reference.

BACKGROUND OF THE INVENTION

1. Field of the Invention

The present invention relates to photographing equipment capable of photographing a three-dimensional image.

2. Description of the Related Art

Modern portable equipment with a photographing function, such as a digital camera, deals successfully with various photographing scenes at which the equipment has difficulty by making full use of image processing. There has recently been a growing trend toward 3D (three-dimensional) films with emphasis on a sense of realism in the film industry. In the wake of the trend, 3D display equipment has been spreading in the TV industry.

In the field of consumer photographing equipment such as a digital camera as well, apparatuses capable of 3D photographing have been developed. Diverse methods have been proposed to photograph and record an image including stereoscopic information and reproduce and observe the image. In order to enable stereoscopic vision, a right image for a right eye and a left image for a left eye, i.e., two images with a parallax corresponding to observation points of the two left and right eyes need to be picked up.

For example, Japanese Patent Application Laid-Open Publication No. 2007-504511 discloses a process of acquiring a stereoscopic image by performing two photographing operations at horizontally shifted positions using a lens for 2D photographing. Note that an apparatus which acquires a 3D image by simultaneously using two image pickup apparatuses (an image pickup apparatus for picking up a right image and an image pickup apparatus for picking up a left image) has been commercialized.

Modern photographing equipment performs automated photographing that includes identifying a scene and performing photographing best suited to the scene. Photographing equipment of this type is configured to detect a face, movement, brightness, and the like from an image to be picked up and perform exposure, focusing, and image processing according to a scene.

SUMMARY OF THE INVENTION

Photographing equipment according to an aspect of the present invention includes an image pickup portion, a display portion which displays an image acquired by the image pickup portion, a determination portion which obtains a distribution of distances to objects in the image acquired by the image pickup portion and determines, on the basis of the obtained distance distribution, whether 3D photographing is effective, and a display controlling portion which displays a representation indicating that 3D photographing is suitable or a representation indicating that 3D photographing is not suitable, on the basis of a result of the determination as to whether 3D photographing is effective by the determination portion.

Photographing equipment according to another aspect of the present invention includes an image pickup portion, a display portion which displays an image acquired by the image pickup portion, a determination portion which obtains a distribution of distances to objects in the image acquired by the image pickup portion and determines, on the basis of the obtained distance distribution, whether 3D photographing is effective, and a control portion which performs photographing support for 3D photographing if a result of the determination as to whether 3D photographing is effective by the determination portion shows that 3D photographing is suitable and performs 2D photographing processing if the result shows that 3D photographing is not suitable.

Photographing equipment according to still another aspect of the present invention includes an image pickup portion, a display portion which displays an image acquired by the image pickup portion, an object detecting portion which detects a reference object of a predetermined size or a larger size of objects in the image acquired by the image pickup portion within an image pickup range of the image pickup portion, and a display controlling portion which displays a representation recommending 3D photographing on the display portion if the object detecting portion detects the reference object.

Photographing equipment according to an aspect of the present invention includes image pickup means, display means which displays an image acquired by the image pickup means, determination means which obtains a distribution of distances to objects in the image acquired by the image pickup means and determines, on the basis of the obtained distance distribution, whether 3D photographing is effective, and display controlling means which displays a representation indicating that 3D photographing is suitable or a representation indicating that 3D photographing is not suitable, on the basis of a result of the determination as to whether 3D photographing is effective by the determination means.

Photographing equipment according to still another aspect of the present invention includes image pickup means, display means which displays an image acquired by the image pickup means, object detecting means which detects a reference object of a predetermined size or a larger size of objects in the image acquired by the image pickup means within an image pickup range of the image pickup means, and display controlling means which displays a representation recommending 3D photographing on the display means if the object detecting means detects the reference object.

The above and other objects, features and advantages of the invention will become more clearly understood from the following description referring to the accompanying drawings.

BRIEF DESCRIPTION OF THE DRAWINGS

FIGS. 2A to 2F are explanatory views for explaining photographing support for 3D photographing according to the first embodiment;

FIGS. 7A and 7B are explanatory views showing another configuration of the distance determining portion 11c;

FIG. 8 is an explanatory diagram showing still another configuration of the distance determining portion 11*c*;

FIGS. 10A to 10D are explanatory charts for explaining a method for determining whether an image is suitable for 3D photographing in the second embodiment;

DETAILED DESCRIPTION OF THE PREFERRED EMBODIMENTS

Embodiments of the present invention will be described in detail below with reference to the drawings.

First Embodiment

Figure 1:
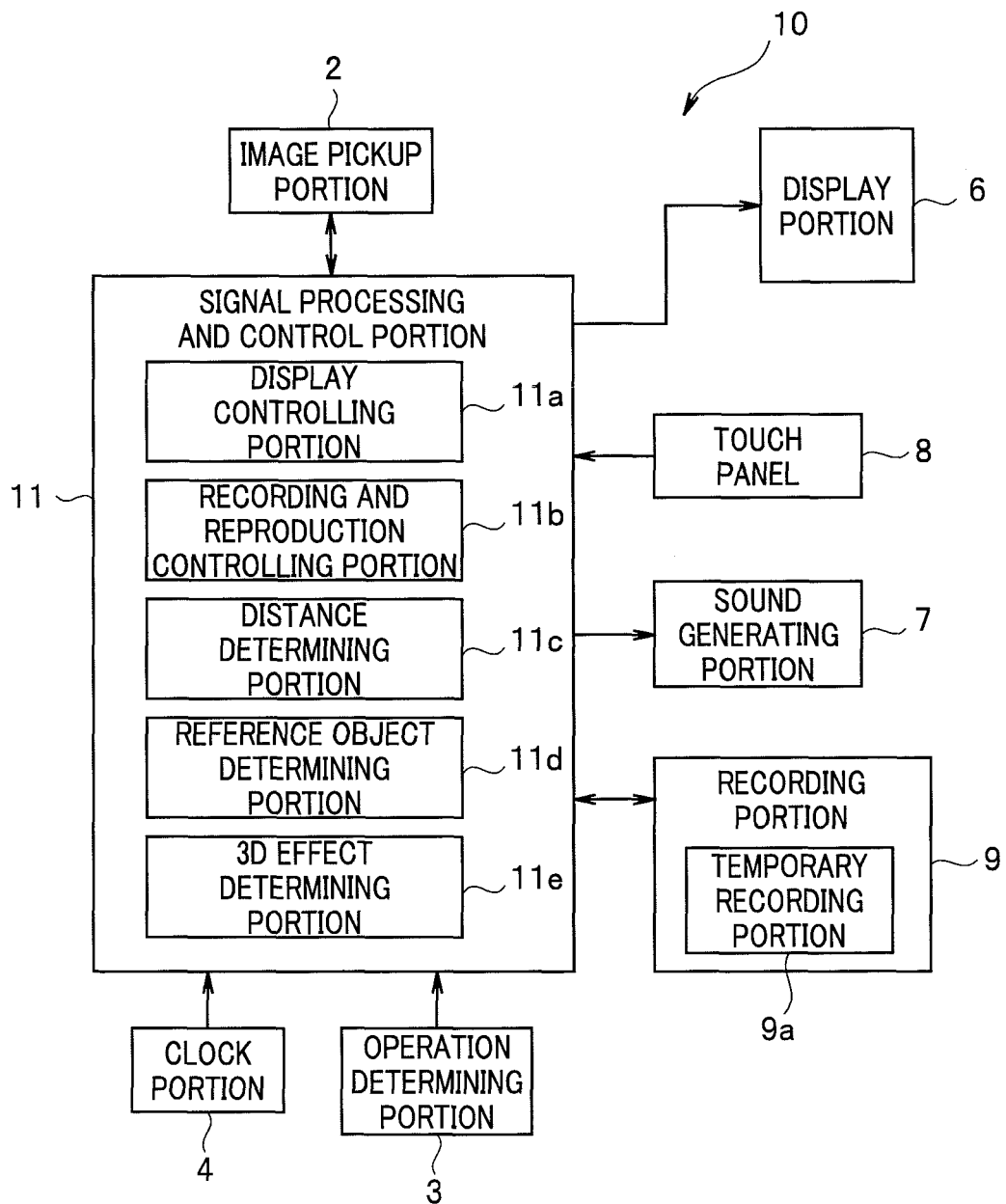
FIG. 1 is a block diagram showing a circuit configuration of photographing equipment according to a first embodiment of the present invention.

FIG. 1 is a block diagram showing a circuit configuration of photographing equipment according to a first embodiment of the present invention.

In the present embodiment, in order to acquire am eye-friendly natural 3D image, a parallax of an object near in front within a photographing range is set to 0, and photographing of a left image and a right image used for 3D display is supported such that a distant object is visible in a depth direction. For example, the present embodiment is configured to detect an object near in front within the photographing range and support photographing such that positions of the object near in front within the photographing range in left and right images coincide with each other.

Photographing equipment 10 includes an image pickup portion 2 which is composed of an image pickup device such as a CCD or a CMOS sensor. The present embodiment is based on the premise that left and right images are acquired by two photographing operations. A photographing lens for 2D photographing having only one optical system can be adopted as the image pickup portion 2. Note that a photographing lens for 3D photographing having two optical systems may be adopted as the image pickup portion 2.

An optical image of an object from an optical system including a photographing lens (not shown) provided on a front surface of the photographing equipment 10 is formed on an image pickup surface of the image pickup device constituting the image pickup portion 2. The image pickup portion 2 is driven and controlled by a signal processing and control portion 11. The signal processing and control portion 11 outputs a signal for driving the image pickup device to the image pickup portion 2 and captures an image signal acquired by the image pickup device photoelectrically converting the optical image.

The signal processing and control portion 11 performs predetermined signal processes, such as color signal generation processing, matrix conversion processing, and various other digital processes on an image signal acquired through photoelectric conversion by the image pickup device. The signal processing and control portion 11 is also configured to be capable of outputting image information, sound information, and the like having undergone compression by encoding when an image signal, a sound signal, and the like are to be recorded.

An operation determining portion 3 and a clock portion 4 are also disposed at the photographing equipment 10. The clock portion 4 generates time information used by the signal processing and control portion 11. The operation determining portion 3 is configured to generate an operation signal based on a user operation on each of a photographing start/end button and various switches (not shown) for, e.g., photographing mode setting provided on the photographing equipment 10 and output the operation signal to the signal processing and control portion 11. The signal processing and control portion 11 controls each portion on the basis of a corresponding operation signal.

A display controlling portion 11*a* and a recording and reproduction controlling portion 11*b* are also provided in the photographing equipment 10. The recording and reproduction controlling portion 11*b* is configured to be capable of supplying image information and sound information from the signal processing and control portion 11 to a recording portion 9 and recording the image information and sound information. The recording portion 9 performs recording and reproduction under control of the recording and reproduction controlling portion 11*b*. For example, a card interface can be adopted as the recording portion 9. The recording portion 9 can record image information, sound information, and the like on a recording medium such as a memory card. The recording portion 9 is also capable of reading out image information and sound information recorded on a recording medium and supplying the image information and sound information to the recording and reproduction controlling portion 11*b* of the signal processing and control portion 11. The signal processing and control portion 11 is configured to be capable of decoding image information and sound information from the recording portion 9 which are reproduced by the recording and reproduction controlling portion 11*b* and acquiring an image signal and a sound signal.

The display controlling portion 11*a* is configured to supply a picked-up image from the image pickup portion 2 or a reproduced image from the recording and reproduction controlling portion 11*b* to a display portion 6 to display the image on the display portion 6. The display controlling portion 11*a* is also configured to be capable of supplying a sound acquired by a microphone (not shown) or a reproduced sound from the recording and reproduction controlling portion 11*b* to a sound generating portion 7 to acoustically output the sound. The display controlling portion 11*a* is further capable of displaying a menu representation for operating the photographing equipment 10 and the like on the display portion 6.

In the present embodiment, a display portion based on a parallax division system such as a parallax barrier system or a lenticular system which is capable of 3D display can be adopted as the display portion 6. According to the parallax division system, 3D display can be performed without use of glasses for 3D display or the like.

The display controlling portion 11*a* performs display control so as to display a right image and a left image as a 3D image recorded in the recording portion 9 at corresponding pixels of the display portion 6 when the right and left images are reproduced. With the control, a picked-up 3D image can be stereoscopically displayed on the display portion 6, and a photographer can confirm stereographic effects on a display screen of the display portion 6.

Note that the display controlling portion 11*a* can also perform 2D display by supplying identical images as left and right images to the display portion 6.

In the present embodiment, a distance determining portion 11*c*, a reference object determining portion 11*d*, and a 3D effect determining portion 11*e* are provided in the signal processing and control portion 11 to determine the effectiveness of 3D photographing and support photographing of an eye-friendly natural 3D image. The recording portion 9 includes a temporary recording portion 9a for enabling photographing support in 3D photographing. One of left and right images acquired through 3D photographing is recorded in the temporary recording portion 9a by the recording and reproduction controlling portion 11b.

FIGS. 2A to 2F are explanatory views for explaining photographing support in 3D photographing according to the present embodiment. FIG. 2A shows how a photographer 21 with the photographing equipment 10 in his/her hands photographs a predetermined photographing range 22. FIG. 2B shows that the predetermined photographing range 22 is displayed as a through image 22a on a display screen 6a of the display portion 6 of the photographing equipment 10. A state in which a building 23a near in front (a distance to which is shorter), a tree 23b at an intermediate position, and a distant mountain 23c can be photographed as objects is shown in the image pickup range 22 in FIG. 2A.

In the present embodiment, the distance determining portion 11c obtains a distance to each object within the photographing range 22. A result of determining the distances from the distance determining portion 11c is supplied to the reference object determining portion 11d. The reference object determining portion 11d detects an object near in front (a distance to which is shorter) within the photographing range 22 on the basis of the distance determination result and supplies a detection result to the display controlling portion 11a and 3D effect determining portion 11e.

Figure 3A:
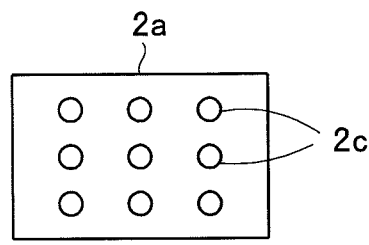
FIGS. 3A to 3C are explanatory charts for explaining an example of a determination method in a distance determining portion 11c.
Figure 3B:
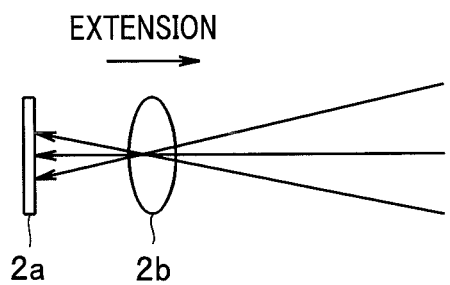
Figure 3C:
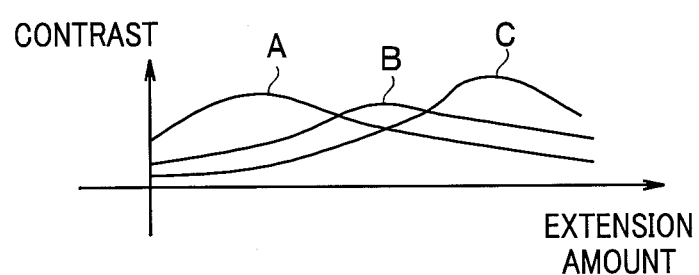

FIGS. 3A to 3C are explanatory charts for explaining an example of a determination method in the distance determining portion 11c.

As shown in FIG. 3A, the distance determining portion 11c sets a plurality of detection points 2c indicated by circles on an image pickup surface 2a of the image pickup portion 2. Although FIG. 3A shows an example in which the number of detection points 2c is 9, the number of detection points can be appropriately set. As shown in FIG. 3B, the distance determining portion 11c forms an object optical image indicated by arrows on the image pickup surface 2a and obtains contrast at each detection point 2c on the image pickup surface 2a while extending or retracting a photographing lens 2b provided at a front of the image pickup portion 2.

In FIG. 3C, an abscissa represents an extension amount of the photographing lens while an ordinate represents contrast, and changes in contrast at three detection points are indicated by characteristic curves A to C. Note that only the characteristic curves A to C corresponding to the three detection points are shown in FIG. 3C for illustrative simplicity. The extension amount corresponds to a distance to an object. A distance to an object can be detected from the extension amount with highest contract in each characteristic curve in FIG. 3C. The larger the extension amount is, the shorter a distance to an object is. It can be seen that an object at a detection point corresponding to the characteristic curve C is one nearest in front in the example in FIG. 3C.

As described above, in the present embodiment, left and right images are separately photographed in 3D photographing. Support is provided so as to determine a image pickup range for one of left and right images with respect to the other image that is to be picked up earlier (hereinafter referred to as a reference image). In the case, the reference object determining portion 11d sets a specific pictorial part (reference object) as a reference and provides photographing support to cause a reference object part in the image to be picked up later to be superimposed on the reference object in the reference image such that a parallax at the reference object is 0.

In the present embodiment, the reference object determining portion 11d is configured to select, as a reference object, an object of a predetermined size or a larger size nearest in front on the basis of a determination result from the distance determining portion 11c.

FIGS. 4A to 4E are explanatory views for explaining an example of a determination method in the reference object determining portion 11d.

FIGS. 4A to 4E are examples of a case where nine detection points LL, CL, RL, LC, CC, RC, LH, CH, and RH indicated by circles are set on the image pickup surface 2a. The reference object determining portion 11d is supplied with a result of detecting a distance to each detection point and compares the detection results. If the results of measuring the distances to adjacent ones of the detection points are substantially equal, the reference object determining portion 11d determines that the detection points are acquired from image pickup of a same object and that the object is relatively large enough to extend over the two detection points.

Figure 4A:
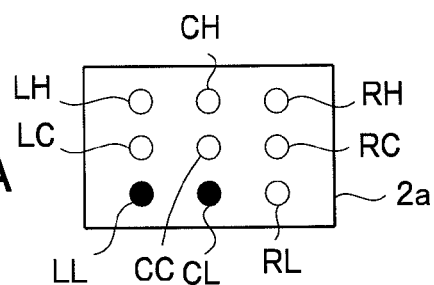
FIGS. 4A to 4E are explanatory views for explaining an example of a determination method in a reference object determining portion 11d.
Figure 4D:
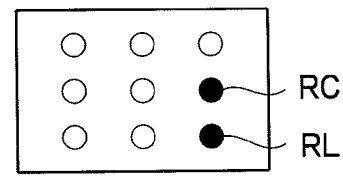
Figure 4B:
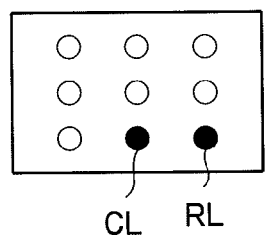
Figure 4E:
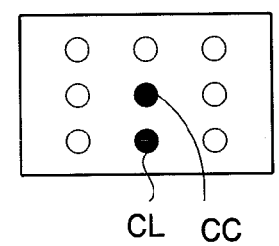
Figure 4C:
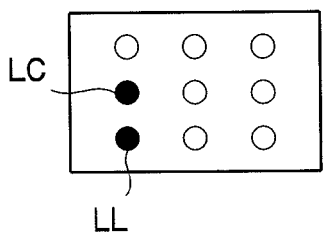

Filled detection points in each of FIGS. 4A to 4E indicate ones which are determined by the distance determining portion 11c to be substantially equal in distance measurement result. That is, FIG. 4A is an example in which the two detection points LL and CL are determined to be at distances substantially equal to each other. Similarly, FIG. 4B is an example in which the two detection points CL and RL are determined to be at distances substantially equal to each other, FIG. 4C is an example in which the two detection points LL and LC are determined to be at distances substantially equal to each other, FIG. 4D is an example in which the two detection points RL and RC are determined to be at distances substantially equal to each other, and FIG. 4E is an example in which the two detection points CL and CC are determined to be at distances substantially equal to each other.

Figure 5:
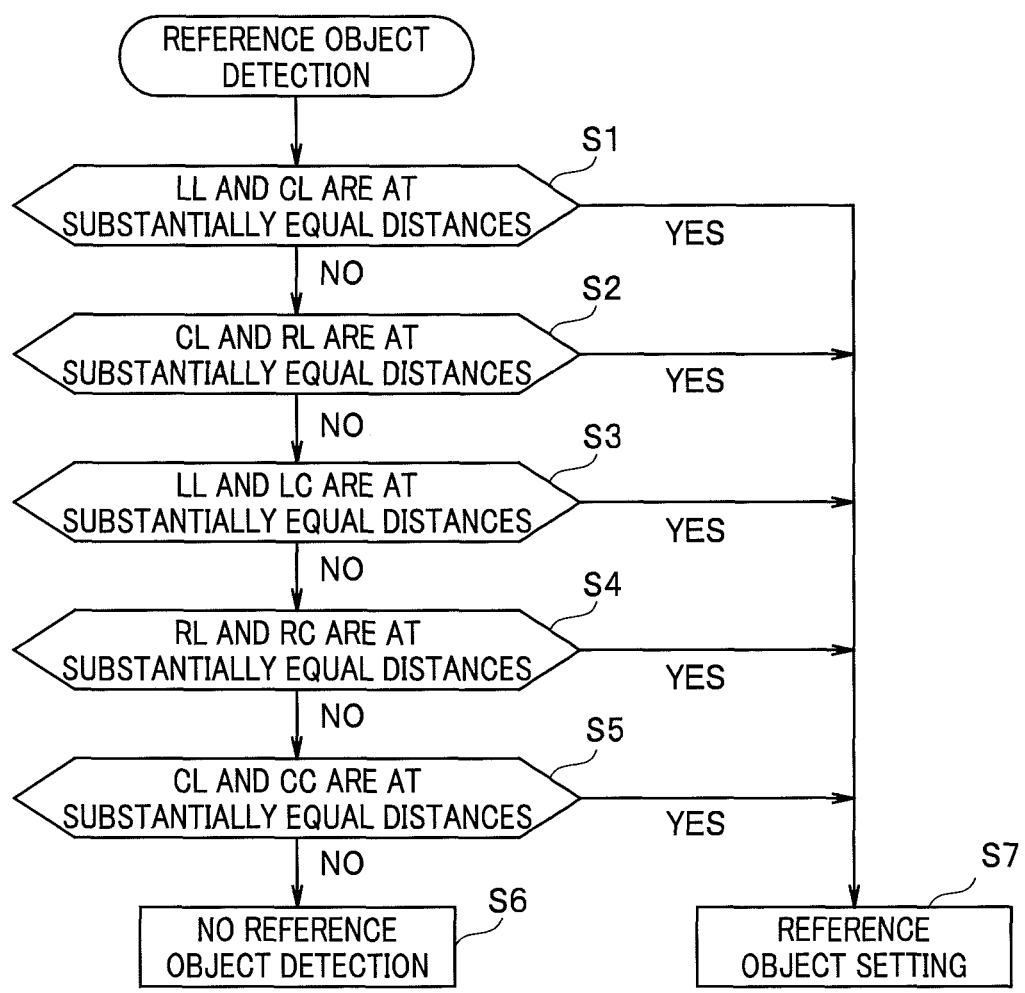
FIG. 5 is a flow chart for explaining determination of a reference object.

The reference object determining portion 11d determines a reference object according to, e.g., a flow chart shown in FIG. 5. In step S1 of FIG. 5, the reference object determining portion 11d determines whether the detection points LL and CL are at distances substantially equal to each other. If the adjacent detection points LL and CL are at distances substantially equal to each other, the reference object determining portion 11d determines that the detection points LL and CL correspond to a same object.

Similarly, the reference object determining portion 11d determines in steps S2 to S5 whether the detection points CL and RL are at distances substantially equal to each other, whether the detection points LL and LC are at distances substantially equal to each other, whether the detection points RL and RC are at distances substantially equal to each other, and whether the detection points CL and CC are at distances substantially equal to each other.

Generally, an object near in front within a photographing range is located at a lower part of the photographing range in a picked-up image while a distant object is located at an upper part of the photographing range. Accordingly, the reference object determining portion 11d is configured to determine whether there is an object of a predetermined size or a larger size near in front by determining whether adjacent ones of the detection points at a lower part of the photographing range are at distances substantially equal to each other. As described above, an object near in front is not searched for across a photographing range, and the assumption is made that an object near in front is located at a lower part of the photographing range. This allows a reduction in the amount of calculation required for reference object determination.

If the reference object determining portion 11d determines in any one of steps S1 to S5 that adjacent ones of the detection points are at substantially equal distances, the reference object determining portion 11d assumes that an object of the predetermined size or a larger size is present near in front, detects outlines around the detection points, and sets a part surrounded by the detected outlines as a reference object (step S7). If the reference object determining portion 11d determines in each of steps S1 to S5 that the adjacent detection points are not at substantially equal distances, the reference object determining portion 11d assumes that there is no reference object (step S6). The reference object determining portion 11d supplies a determination result to the 3D effect determining portion 11e and display controlling portion 11a.

The 3D effect determining portion 11e determines that 3D photographing is effective if there is a reference object which is an object of the predetermined size or a larger size near in front and determines that 3D photographing is not effective if there is no reference object. The 3D effect determining portion 11e controls the display controlling portion 11a to display a result of determining whether 3D photographing is effective as an advisory representation on the display portion 6.

The display controlling portion 11a is configured to display a representation indicating a reference object in a picked-up image being displayed as a through image on the basis of a determination result from the reference object determining portion 11d if the current photographing range is suitable for 3D photographing. FIG. 2B shows a display example on the display screen 6a in the case. In the example in FIG. 2B, a highlighted representation 24 (hatched part) indicating a reference object is displayed at the building 23a that is an object near in front within the image pickup range 22 in FIG. 2A.

As described above, in the present embodiment, an object near in front (a reference object) is assumed to have a parallax of 0, and photographing is performed such that a distant object is visible in a depth direction. An arrow (3D) in FIG. 2B indicates that 3D photographing is effective and also indicates in which direction the photographing equipment 10 is to be pointed when an image to be picked up later is picked up in order that a distant object may be visible in the depth direction. When photographing is performed in the state in FIG. 2B, a photographed image is recorded in the temporary recording portion 9a by the recording and reproduction controlling portion 11b. Note that FIG. 2C shows an image within the photographing range acquired at the time of the photographing.

Note that FIGS. 2A to 2F each show an example with an object of the predetermined size or a larger size near in front. If there is not such an object within the photographing range, the 3D effect determining portion 11e may control the display controlling portion 11a to display a message representation indicating that the current photographing range is not suitable for 3D photographing.

If there is an object of the predetermined size or a larger size (a reference object) near in front, the 3D effect determining portion 11e determines that photographing suitable for 3D photographing is possible and controls the display controlling portion 11a to display a representation for prompting a photographer to choose whether to perform 3D photographing. FIG. 2D shows an example in which a selection representation 26 saying "Photograph again?" is displayed as such a selection representation.

For example, if the display portion 6 and a touch panel 8 share a screen, the photographer can give an instruction for 3D photographing by touching a position where the selection representation 26 saying "Photograph again?" is displayed.

Note that an instruction for 3D photographing can also be acquired from a result of operation determination by the operation determining portion 3.

When an instruction for 3D photographing is given, the display controlling portion 11a displays a representation 27 (hatched part) indicating a reference object on the through image, as shown in FIG. 2E. For example, the representation 27 indicating the reference object may be highlighted while a first image acquired through photographing in the state in FIG. 2B is transparently displayed. Alternatively, only a reference object part in the first image may be extracted and displayed.

The photographer determines a photographing range 22' such that a reference object part in the through image corresponding to the reference object representation 27 is superimposed on the reference object representation 27. In the case, although a position of the building 23a in the photographing range 22' is same as a position of the building 23a in the photographing range 22, positions of a tree 23b' and a mountain 23c' in the photographing range 22' are shifted from positions of the tree 23b and mountain 23c in the photographing range 22.

FIG. 2F shows a through image 22a' in the case. If a pictorial part corresponding to a reference object in the through image 22a' substantially coincides with a reference object part in the recorded image, the display controlling portion 11a may display a representation 28 saying "3DOK" shown in FIG. 2F. The photographer can recognize that the photographing range 22' is a photographing range for acquiring a natural eye-friendly 3D image by confirming the representation.

When the photographer performs a photographing operation, the recording and reproduction controlling portion 11b associates a second picked-up image acquired through the photographing operation with the first picked-up image recorded in the temporary recording portion 9a and records the picked-up images in the recording portion 9.

Note that although FIGS. 2A to 2F illustrate an example in which an advisory representation is displayed in a through image before pickup of a first image, the advisory representation may be displayed after the first image is photographed.

Operation according to the embodiment with the above-described configuration will be described with reference to a flow chart in FIG. 6.

Figure 6:
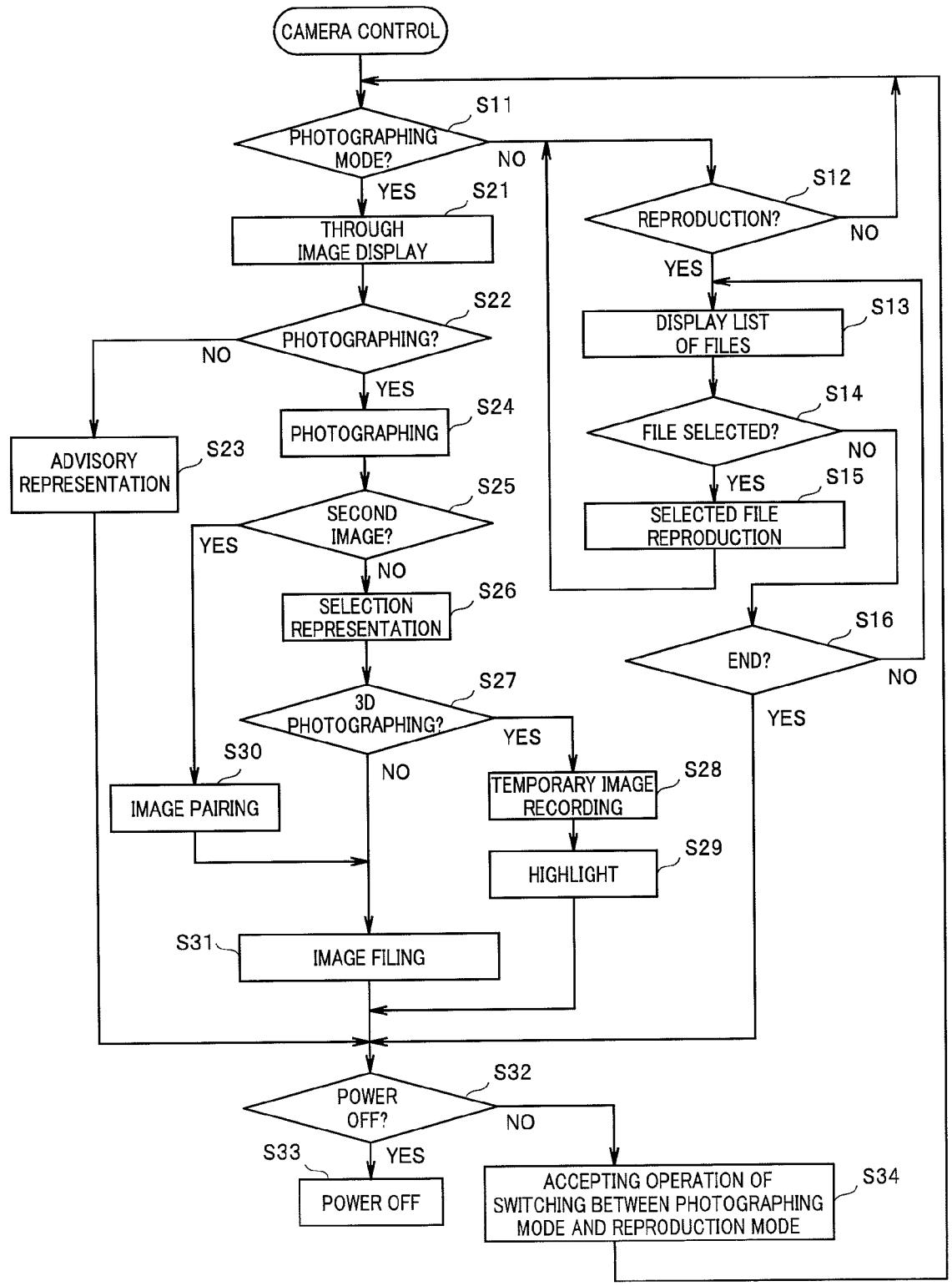
FIG. 6 is a flow chart for explaining operation according to the first embodiment.

When the photographing equipment 10 is powered on, the signal processing and control portion 11 determines in step S11 of FIG. 6 whether the photographing equipment 10 is in photographing mode. If the photographing equipment 10 is not in photographing mode, the signal processing and control portion 11 determines in step S12 whether reproduction mode is selected.

If the signal processing and control portion 11 determines in step S12 that reproduction mode is selected, the signal processing and control portion 11 shifts the process from step S12 to step S13. The signal processing and control portion 11 reads out information on a list of files recorded by the recording portion 9 and causes a representation of the list of files to be displayed on the display portion 6.

If a user selects a file (step S14) when the list of files is displayed, the signal processing and control portion 11 reads out the selected file via the recording and reproduction controlling portion 11b, subjects the file to decoding processing, and reproduces image signals and sound signals (step S15). The signal processing and control portion 11 supplies the reproduced image signals and sound signals to the display portion 6 to provide a display.

Note that if an end operation is performed when the list of files is displayed, the signal processing and control portion 11 shifts the process from step S14 to step S16 to end reproduction mode.

If the signal processing and control portion 11 determines in step S11 that photographing mode is selected, the signal processing and control portion 11 displays a through image in step S21. That is, the signal processing and control portion 11 takes in a picked-up image from the image pickup portion 2, subjects the image to predetermined signal processing, and causes the display controlling portion 11a to output the image to the display portion 6. In the manner, the through image is displayed on the display screen of the display portion 6.

In the present embodiment, the signal processing and control portion 11 displays an advisory representation for 3D photographing in step S23 before photographing in step S24. That is, the distance determining portion 11c obtains a distance to each object in the through image. A result of the distance determination from the distance determining portion 11c is supplied to the reference object determining portion 11d. The reference object determining portion 11d detects a reference object which is an object of a predetermined size or a larger size near in front in the through image on the basis of the distance determination result and supplies a result of the detection to the 3D effect determining portion 11e.

A size of an object which causes eyes of a person to be spontaneously drawn to the object when the person unconsciously views a photograph including the object is conceivable as the predetermined size. The predetermined size is often determined by comparing something with others within a screen. That is, if there is an object larger than another small object within an image pickup range, a person views the image pickup range such that eyes of the person are first drawn to the larger object and then shifted to the small object from the larger object as a reference. In the case, the predetermined size is determined by comparison with another object. For example, the reference object determining portion 11d may detect objects within the image pickup range, compare sizes of the objects, and determine one of the objects which is larger than an average of the sizes as one of the predetermined size or a larger size or select an object of a largest size of the objects as a reference object. Alternatively, the user may specify the predetermined size.

Note that results of identifying a person, an animal, a flower, a tree, a sky, a cloud, a mountain, and a building using characteristic image information such as outlines, contrast, and color by a technique typified by, e.g., face detection and a cluster of detected things at a same distance are considered as individual objects here.

If a building exhibits high contrast, high brightness, and a high level of color saturation in an example with the building against a gently sloping mountain range, as in a landscape, eyes are drawn to the building near in front in spite of the large size of the mountains. According to the present embodiment, the building is also considered as an object of the predetermined size or a larger size near in front. In such a case, a thing near in front is often located below a mountain due to gravity. Accordingly, an object not less than one tenth of a size of a screen at a lower part of the screen is assumed to meet the requirement that "a reference object is located near in front in an image and is of a predetermined size or a larger size."

We are accustomed to a pictorial representation in "one-point perspective" in which distant elements in a screen converge at a single point. A distance relationship among elements arranged toward a single point is easy to see when an element size decreases from a periphery of a screen with an increase in distance. Assume a case where a person as an object is present at a center of a screen as in the Mona Lisa. If there is an object near in front in the screen, it is easy to recognize sides of the person or the like as a background with respect to the object near in front as a reference. That is, the object in the case can be treated as "being located near in front in an image and being of the predetermined size or a larger size."

If the 3D effect determining portion 11e determines that there is a reference object in the through image, the 3D effect determining portion 11e causes the highlighted representation 24 and advisory representation 25 shown in FIG. 2B to be displayed (step S23). A photographer can recognize on the basis of the representations 24 and 25 displayed on the through image on the display portion 6 that an image within a photographing range currently displayed as the through image is suitable for 3D photographing and which object should be set as a reference and in which direction the photographing range should be moved when a second image is to be picked up in order to acquire a natural eye-friendly 3D image.

When the photographer presses a release button, the process shifts from step S22 to step S24 to perform photographing. The signal processing and control portion 11 determines in step S25 whether a photographing operation to be performed is intended for a second image in 3D photographing.

If the photographing operation is intended for a first image, the display controlling portion 11a causes the selection representation 26 shown in FIG. 2D to be displayed in the next step, S26. The photographer gives an instruction for 3D photographing or 2D photographing in response to the selection representation 26. The signal processing and control portion 11 determines in step S27 whether an instruction for 3D photographing is given. If the photographer has not given an instruction for 3D photographing, the signal processing and control portion 11 subjects a picked-up image from the image pickup portion 2 to the predetermined signal processing and encodes the resultant image into an image file. After that, the signal processing and control portion 11 supplies the image file to the recording portion 9 to record the image file (step S31).

If the signal processing and control portion 11 determines in step S27 that the photographer has given an instruction for 3D photographing, the signal processing and control portion 11 subjects the picked-up image from the image pickup portion 2 to the predetermined signal processing and encodes the resultant image. After that, the signal processing and control portion 11 records the encoded image in the temporary recording portion 9a (step S28).

The signal processing and control portion 11 highlights a reference object part in step S29. With the operation, for example, the reference object representation 27 shown in FIG. 2E is displayed.

As shown in FIG. 2F, the photographer superimposes a reference object part in the through image 22a' on the reference object representation 27. When the reference object part in the through image 22a' is superimposed on the reference object representation 27, the signal processing and control portion 11 displays the representation 28 saying "3DOK" in step S23. The photographer presses the release button in the state.

Since the operation is an image pickup operation for a second image in 3D photographing, the signal processing and control portion 11 shifts the process from step S25 to step S30 to pair the images. That is, the signal processing and control portion 11 subjects a picked-up image from the image pickup portion 2 to the predetermined signal processing, pairs the picked-up image with the image from the temporary recording portion 9a, and records the pair of images in the recording portion 9 (step S31). Note that the signal processing and control portion 11 may encode the paired left and right images and record the images in the recording portion 9.

The recording and reproduction controlling portion 11b is further capable of reproducing a photographed 3D image and causing the display controlling portion 11a to stereoscopically display the 3D image on the display portion 6. The photographer can confirm effects of 3D photographing by viewing a display on the display portion 6.

The signal processing and control portion 11 determines in step S32 whether a power-off operation has been performed. If a power-off operation has been performed, the signal processing and control portion 11 performs power-off processing in step S33. On the other hand, if a power-off operation has not been performed, the signal processing and control portion 11 accepts an operation of switching between photographing mode and reproduction mode if any in step S34 and returns the process to step S11.

Note that the signal processing and control portion 11 performs normal photographing processing if the 3D effect determining portion 11d determines that an image to be photographed is not suitable for 3D photographing.

As described above, in the present embodiment, it is determined whether an image within a photographing range is suitable for 3D photographing. A result of the determination is displayed as an advisory representation, and how to photograph in order to enable natural eye-friendly 3D photographing is also displayed as an advisory representation. A user can easily acquire a natural eye-friendly 3D image which is easy to see.

(Modification)

FIGS. 7A, 7B, and 8 are explanatory views showing another configuration of the distance determining portion 11c.

FIGS. 7A and 7B show distance measurement using a pupil division phase difference system. As shown in FIG. 7A, pixels 2d for focus detection (a hatched part) are provided at predetermined intervals at an image pickup surface 2a1 of the image pickup portion 2. FIG. 7B shows that a microlens 2f is arranged in front of each pixel 2d and that light beams (indicated by arrows) from an object enter the pixel 2d via lens portions 2gl and 2gr of an imaging lens 2g and the microlens 2f. Each pixel 2d is divided into two divided pixels 2dl and 2dr, and light beams from a single object enter the divided pixels 2dl and 2dr in different directions.

A distance to an object is obtained by comparing outputs from the divided pixels 2dl of all the pixels 2d in one line with outputs from the divided pixels 2dr of all the pixels 2d in the one line. When the imaging lens 2g is located at a focused position, first signals acquired by all the divided pixels 2dl in one line coincide with second signals acquired by all the divided pixels 2dr in the one line.

However, when the imaging lens 2g is not located at the focused position, the first signals and the second signals are out of phase with each other according to a defocus amount and a defocus direction. That is, phase differences between first signals and second signals correspond to a distance to an object. The distance determining portion 11c can obtain a distance to an object on the basis of phase differences between first signals and second signals and a lens position.

FIG. 8 shows an example of a case where a photographing lens for 3D photographing is adopted as the image pickup portion 2.

In the example in FIG. 8, the image pickup portion 2 includes a photographing lens 2R1 and an image pickup surface 2R2 for a right eye and a photographing lens 2L1 and an image pickup surface 2L2 for a left eye. Light beams (indicated by arrows) from two objects 31 and 32 form images at the image pickup surface 2R2 through the photographing lens 2R1 and form images at the image pickup surface 2L2 through the photographing lens 2L1. Different positions at each of the image pickup surfaces 2L2 and 2R2 where light beams from the objects 31 and 32 form images correspond to distances L1 and L2 to the objects 31 and 32. The distances L1 and L2 can be obtained by performing arithmetic operations using a known base length B between the photographing lenses 2L1 and 2R1.

In addition to the above distance detection methods, a process of obtaining a distance on the basis of an object size is available. A size of an object within an image pickup range increases with a decrease in a distance to the object and decreases with an increase in the distance to the object. Accordingly, a relatively large object within an image pickup range is considered to be at a short distance, and a relative small object is considered to be at a long distance.

Second Embodiment

Figure 9:
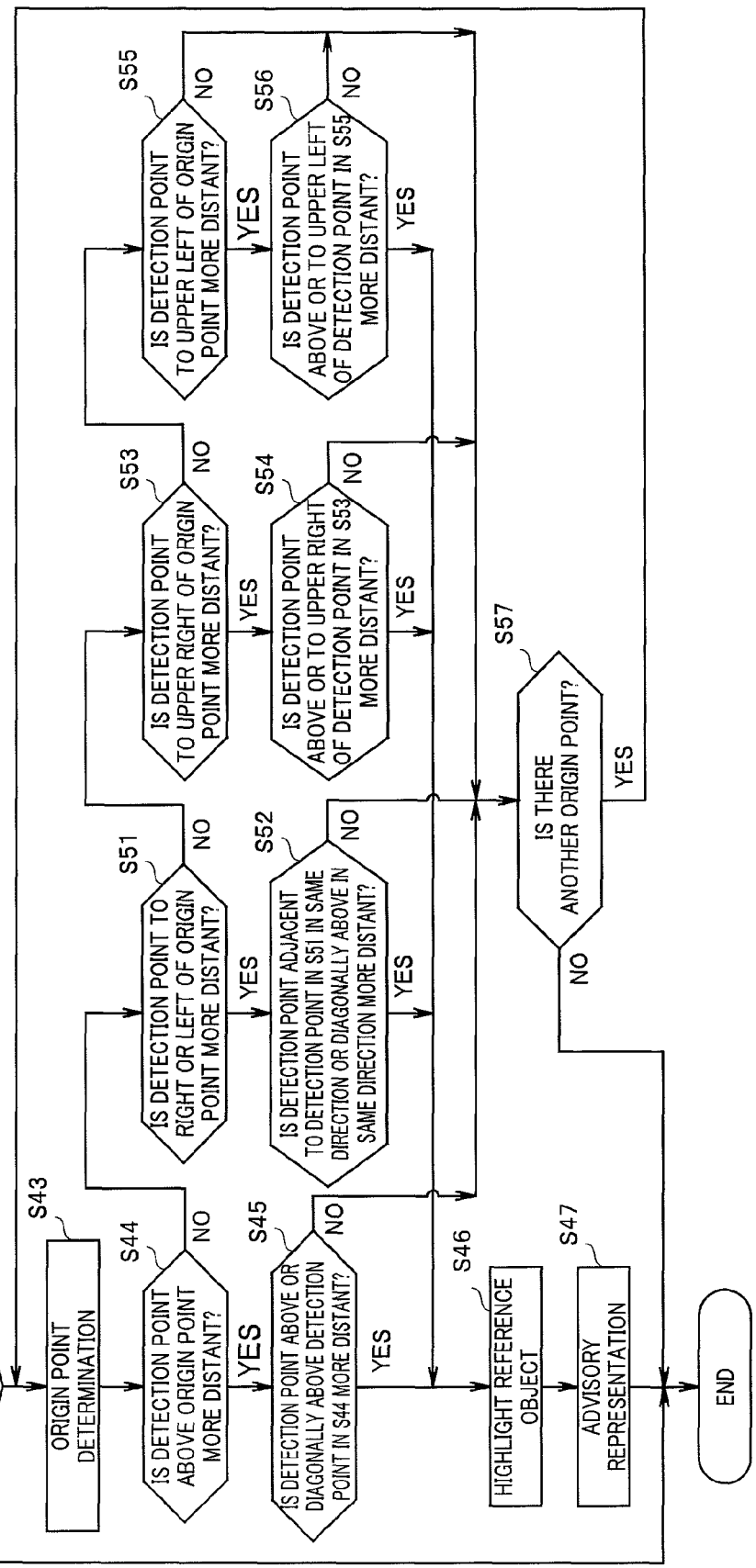
FIG. 9 is a flow chart for explaining a method for supporting 3D photographing adopted in a second embodiment of the present invention.

FIG. 9 is a flow chart for explaining a method for supporting 3D photographing adopted in a second embodiment of the present invention. A hardware configuration according to the present embodiment is same as the hardware configuration of the first embodiment. The present embodiment is different from the first embodiment in a determination method in a 3D effect determining portion 11e.

In the first embodiment, an object near in front within a photographing range is set to have a parallax of 0, and a process of supporting photographing of a left image and a right image used for 3D display such that a distant object is visible in a depth direction is enabled, in order to acquire an eye-friendly natural 3D image. The present embodiment is further configured to determine in consideration of a correlation between a two-dimensional position of each object within a photographing range and a distance whether an image within the photographing range is suitable for 3D display.

FIGS. 10A to 10D are explanatory charts for explaining a method for determining whether an image is suitable for 3D photographing according to the present embodiment.

FIG. 10A shows an image within a photographing range formed on an image pickup surface 2a of an image pickup portion 2. Within the image pickup range shown in FIG. 10A, objects 41a and 41b which are buildings are located near in front, and an object 41c which is a mountain is distantly located. Circles in FIG. 10A indicate detection points set on the image pickup surface 2a. FIG. 10B shows a relationship between a horizontal position in a screen of each of three detection points corresponding to the three objects 41a, 41b, and 41c in FIG. 10A and a distance to the object corresponding to the detection point.

In the present embodiment as well, a relatively large object near in front is set to have a parallax of 0, and a process of performing photographing such that a distant object is visible in a depth direction is supported. Assume that the hatched object 41a is determined to be a reference object in FIG. 10A.

FIG. 10C is intended to explain a change in parallax when a person views a picked-up image while shifting his/her gaze from left to right at the time of such photographing. Left, middle, and right views of FIG. 10C show how the person views the object 41a in FIG. 10A, how the person views the object 41b, and how the person views the object 41c, respectively.

In FIG. 10C, filled parts of left and right eyes 43 indicate how the gaze changes. A person changes from a state in which an object is visible at a position of a display screen 44 to a state in which an object is visible in the depth direction as the person shifts his/her gaze from left to right across the image shown in FIG. 10A. That is, it seems to a person that the object 41a is visible at a surface of the display screen 44, that the object 41b is visible behind the surface of the display screen 44 by $\Delta z1$, and that the object 41c is visible behind the surface of the display screen 44 by $\Delta z2$ ($>\Delta z1$).

FIG. 10D shows a change in a sense of depth felt by a person with respect to eye movement. As shown in FIG. 10D, the amount of eye movement and a sense of depth change in correlation with each other. As described above, if a person can start at a near object as a reference in an image and shift his/her gaze from one object to another more distant object, it is considered that the person can relatively easily feel a sense of perspective to prevent eye strain.

The present embodiment is thus configured to determine an image for which the amount of eye movement and a sense of depth can change in correlation with each other as an image suitable for 3D display.

FIGS. 11A to 11E are explanatory views for explaining a determination method in the 3D correlation determining portion 11e. In the present embodiment as well, the 3D correlation determining portion 11e uses presence of an object (reference object) of a predetermined size or a larger size near in front as one of criteria for determining that an image is suitable for 3D photographing.

In the present embodiment, the 3D correlation determining portion 11e determines whether a position of each of detection points substantially linearly arranged on a two-dimensional plane and a distance to an object corresponding to the detection point have a correlation with each other and, if the position and distance have a correlation, determines that an image in question is suitable for 3D display, in order to identify an image for which the amount of eye movement and a sense of depth change in correlation with each other.

FIGS. 11A to 11E show detection points set on the image pickup surface 2a which are indicated by circles. In each of FIGS. 11A to 11E, filled detection points indicate that distances to an object including the detection points are substantially equal. That is, FIGS. 11A to 11E each show an example which is determined to include an object of a sufficiently large size near in front.

Figure 11A:
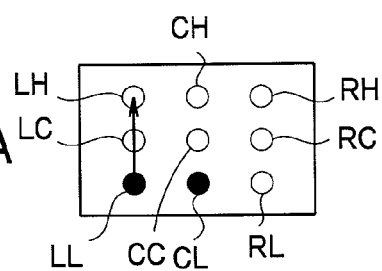
FIGS. 11A to 11E are explanatory views for explaining a determination method in a 3D correlation determining portion 11*e*.
Figure 11B:
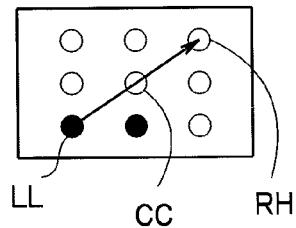
Figure 11C:
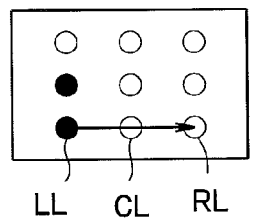
Figure 11D:
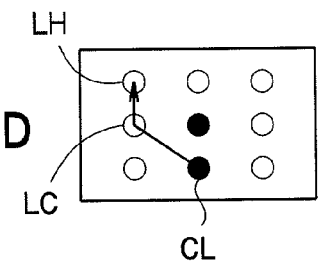
Figure 11E:
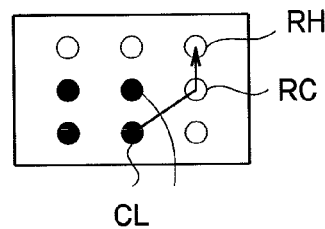

Each arrow in FIGS. 11A to 11E indicates a line of detection points substantially linearly arranged on a two-dimensional plane. For example, FIG. 11A shows a line of three detection points LL, LC, and LH arranged in a vertical direction on the two-dimensional plane, FIG. 11B shows a line of three detection points LL, CC, and RH arranged in a diagonal direction on the two-dimensional plane, and FIG. 11C shows a line of three detection points LL, CL, and RL arranged in a horizontal direction on the two-dimensional plane. FIGS. 11D and 11E show a line of three detection points CL, LC, and LH and a line of three detection points CL, RC, and RH relatively linearly arranged on the two-dimensional plane.

As illustrated in FIGS. 11A to 11E, the 3D correlation determining portion 11e is configured to determine that an image in question is suitable for 3D display if a detection point which is more distant from a detection point as a reference corresponding to an object nearest in front is at a greater distance from a corresponding object in any of lines of detection points relatively linearly arranged on the two-dimensional plane.

Note that although the examples in FIGS. 11A to 11E are examples in which 3×3 detection points are set on the image pickup surface 2a, the number of detection points can be appropriately set. The 3D correlation determining portion 11e may select detection points such that a distance from one as a reference of the detection points increases stepwise from one detection point to a next one and set a line of detection points used for determination. Note that the 3D correlation determining portion 11e may select detection points meeting, e.g., the requirement that a line connecting detection points is not bent by 90° or more on a two-dimensional plane as a line of relatively linearly arranged detection points, for the sake of convenience. For example, in FIGS. 11A to 11E, a line of detection points CC, LC, and CH may also be used to determine 3D effects. Alternatively, a line connecting detection points which are not adjacent to one another may be adopted if, for example, the number of detection points is large.

Operation of the 3D effect determining portion 11e will be described with reference to FIG. 9. FIGS. 12A to 12E are explanatory charts for explaining a flow in FIG. 9.

In step S41 of FIG. 9, the distance determining portion 11c obtains a distance to an object at each of detection points. The reference object determining portion 11d acquires a reference object using a result of the determination by the distance determining portion 11c. The 3D effect determining portion 11e determines in step S42 whether there is a reference object. If there is no reference object, the 3D effect determining portion 11e determines from an image pickup range that an image is not suitable for 3D photographing and ends the process.

On the other hand, if there is a reference object, the 3D effect determining portion 11e determines an origin point in the next step, S43. The 3D effect determining portion 11e sets a detection point of a line of detection points which is located at a lowest position, i.e., one corresponding to an object near in front as an origin point.

The 3D effect determining portion 11e determines in step S44 whether an object at a detection point above a detection point as each origin point on an image pickup surface is an object located more distantly than the object at the detection point as the origin point, using the result of the determination by the distance determining portion 11c. The 3D effect determining portion 11e further determines in step S4.5 whether an object at a detection point above or diagonally above the detection point checked in step S44 on the image pickup surface is an object located more distantly than the object at the detection point in step S44, using the result of the determination by the distance determining portion 11c.

FIGS. 12A to 12E are intended to explain a line of detection points used for determination by the 3D effect determining portion 11e, and each arrow indicates a line of detection points. Steps S44 and S45 are procedures for determining, for each of seven lines shown in FIG. 12A, whether a higher one of detection points corresponds to a more distant object. That is, steps S45 and S46 allow determining whether a position of each detection point and a distance to an object included at the detection point have a correlation with each other in, e.g., the line of detection points in FIG. 11A.

If the 3D effect determining portion 11e detects in steps S44 and S45 that a higher detection point is at a greater distance from an object, the 3D effect determining portion 11e highlights the reference object for 3D photographing in step S46 and displays an advisory representation 25 (step S47).

If the detection point above the origin point does not correspond to an object more distant than the object at the detection point as the origin point in step S44, the 3D effect determining portion 11e shifts the process to step S51. The 3D effect determining portion 11e determines in step S51 whether an object at a detection point to the right or the left of the detection point as the origin point at each end of the image pickup surface on the image pickup surface is an object located more distantly than the object at the detection point as the origin point, using the result of the determination by the distance determining portion 11c. The 3D effect determining portion 11e determines in step S52 whether an object at a detection point adjacent to the detection point checked in step S51 in a same direction or diagonally above in the same direction on the image pickup surface is an object located more distantly than the object at the detection point in step S51, using the result of the determination by the distance determining portion 11c.

Figure 12A:
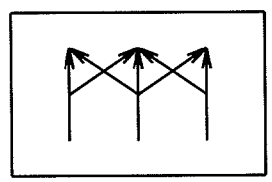
FIGS. 12A to 12E are explanatory charts for explaining a line of detection points used for determination by the 3D effect determining portion 11*e*.
Figure 12D:
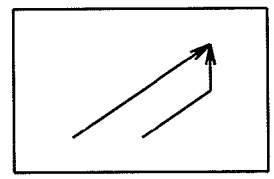
Figure 12B:
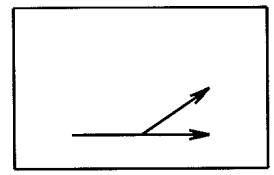
Figure 12E:
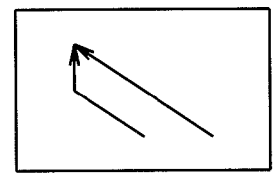
Figure 12C:
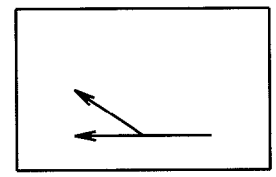

In other words, steps S51 and S52 are procedures for determining, for each of two lines shown in FIG. 12B or two lines shown in FIG. 12C, whether there is a detection point corresponding to a more distant object. That is, steps S51 and S52 allow determining whether a position of each detection point and a distance to an object included at the detection point have a correlation with each other in, e.g., the line of detection points in FIG. 11C.

If the detection point to the right or the left of the origin point at each end of the image pickup surface does not correspond to a distant object in step S51, the 3D effect determining portion 11e shifts the process to step S53. The 3D effect determining portion 11e determines in step S53 whether an object at a detection point to the upper right of the detection point as each origin point on the image pickup surface is an object located more distantly than the object at the detection point as the origin point, using the result of determination by the distance determining portion 11c. The 3D effect determining portion 11e determines in step S54 whether an object at a detection point above or to the upper right of the detection point checked in step S53 on the image pickup surface is an object located more distantly than the object at the detection point in step S53, using the result of the determination by the distance determining portion 11c.

In other words, steps S53 and S54 are procedures for determining, for each of two lines shown in FIG. 12D, whether there is a detection point corresponding to a more distant object. Steps S53 and S54 allow determining whether a position of each detection point and a distance to an object included at the detection point have a correlation with each other in, e.g., the line of detection points in FIG. 11B or the line of detection points in FIG. 11E.

If the detection point to the upper right of the origin point at each end of the image pickup surface does not correspond to a distant object in step S53, the 3D effect determining portion 11e shifts the process to step S55. The 3D effect determining portion 11e determines in step S55 whether an object at a detection point to the upper left of the detection point as each origin point on the image pickup surface is an object located more distantly than the object at the detection point as the origin point, using the result of determination by the distance determining portion 11c. The 3D effect determining portion 11e determines in step S56 whether an object at a detection point above or to the upper left of the detection point checked in step S55 on the image pickup surface is an object located more distantly than the object at the detection point in step S55, using the result of the determination by the distance determining portion 11c.

In other words, steps S55 and S56 are procedures for determining, for each of two lines shown in FIG. 12E, whether there is a detection point corresponding to a more distant object. Steps S55 and S56 allow determining whether a position of each detection point and a distance to an object included at the detection point have a correlation with each other in, e.g., the line of detection points in FIG. 11D.

If the 3D effect determining portion 11e detects in step S52, S54, or S56 that a detection point at a greater distance from a detection point as an origin point is at a greater distance from an object, the 3D effect determining portion 11e highlights the reference object for 3D photographing in step S46 and displays the advisory representation 25 (step S47).

If a result of the determination in steps S45, S52, and S54 to S56 is NO, the 3D effect determining portion 11e determines in step S57 whether there is another origin point. If there is another origin point, the 3D effect determining portion 11e returns the process to step S43 to repeat the processes in steps S44 to S47 and S51 to S56 for the origin point.

Note that the example in FIG. 9 illustrates a case where 3×3 detection points shown in FIGS. 11A to 11E are set. The example in FIG. 9 is an example in which only a line of detection points that is not bent by 90° or more is selected. In a case where the number of detection points is different or in other cases, a determination method different from the determination method in FIG. 9 can be adopted.

Other actions of the present embodiment are same as actions of the first embodiment.

As described above, the present embodiment determines whether an image is suitable for 3D photographing, on the basis of not only whether there is an object of a predetermined size or a larger size near in front but also whether a position in a two-dimensional plane of an object on a screen and a distance to the object have a correlation with each other. The present embodiment can provide photographing support for acquiring an eye-friendly natural 3D image.

Having described the preferred embodiments of the invention referring to the accompanying drawings, it should be understood that the present invention is not limited to those precise embodiments and various charges and modifications thereof could be made by one skilled in the art without departing from the spirit or scope of the invention as defined in the appended claims.

What is claimed is:

1. Photographing equipment comprising:
   an image pickup portion;
   a display portion which displays an image acquired by the image pickup portion;
   a determination portion which (1) obtains a distribution of distances from the image pickup portion to objects in the image acquired by the image pickup portion, (2) sets a plurality of detection points within a photographing range of the image pickup portion, and (3) determines, automatically, whether 3D photographing is suitable based on whether or not a position of each of the detection points is substantially linearly arranged on a two-dimensional plane and distances to objects corresponding to the detection points have a correlation with each other; and
   a display controlling portion which displays a representation indicating that 3D photographing is suitable responsive to a determination, by the determination portion, that 3D photographing is suitable, and which otherwise does not display the representation indicating that 3D photographing is suitable responsive to a determination, by the determination portion, that 3D photographing is not suitable.

2. The photographing equipment according to claim 1, wherein the determination portion determines, on the basis of a distribution of distances at the plurality of detection points, whether there is a reference object which is of a predetermined size or a larger size within an image pickup range of the image pickup portion, and determines whether 3D photographing is suitable based, in part, on its determination of whether there is a reference object which is of a predetermined size or a larger size within an image pickup range of the image pickup portion.

3. The photographing equipment according to claim 1, wherein the determination portion determines whether distances to objects corresponding to the detection points have a correlation with each other by obtaining a correlation between positions of the plurality of detection points and distances on the basis of a distribution of the distances at the plurality of detection points.

4. Photographing equipment comprising:
an image pickup portion;
a display portion which displays an image acquired by the image pickup portion;
a determination portion which (1) obtains a distribution of distances from the image pickup portion to objects in the image acquired by the image pickup portion, (2) sets a plurality of detection points within a photographing range of the image pickup portion, and (3) determines, automatically, whether 3D photographing is suitable based on whether or not a position of each of the detection points is substantially linearly arranged on a two-dimensional plane and distances to objects corresponding to the detection points have a correlation with each other; and
a control portion which provides photographing support for 3D photographing responsive to a determination by the determination portion that 3D photographing is suitable and otherwise performs 2D photographing processing responsive to a determination by the determination portion that 3D photographing is not suitable.

5. The photographing equipment according to claim 4, wherein the determination portion determines, on the basis of a distribution of distances at the plurality of detection points, whether there is a reference object which is of a predetermined size or a larger size within an image pickup range of the image pickup portion, and determines whether 3D photographing is suitable based, in part, on its determination of whether there is a reference object which is of a predetermined size or a larger size within an image pickup range of the image pickup portion.

6. The photographing equipment according to claim 4, wherein the determination portion determines whether distances to objects corresponding to the detection points have a correlation with each other by obtaining a correlation between positions of the plurality of detection points and distances on the basis of a distribution of the distances at the plurality of detection points.

7. Photographing equipment comprising:
an image pickup portion;
a display portion which displays an image acquired by the image pickup portion;
an object detecting portion which determines whether a reference object of a predetermined size or a larger size among objects in the image acquired by the image pickup portion within an image pickup range of the image pickup portion is detected;
a determination portion which (1) obtains a distribution of distances from the image pickup portion to objects in the image acquired by the image pickup portion, (2) sets a plurality of detection points within a photographing range of the image pickup portion, and (3) determines, automatically, whether 3D photographing is suitable based on whether or not a position of each of the detection points is substantially linearly arranged on a two-dimensional plane and distances to objects corresponding to the detection points have a correlation with each other; and
a display controlling portion which displays a representation recommending 3D photographing on the display portion responsive to a determination by the object detecting portion that a reference object of a predetermined size or a larger size is detected and a further determination by the determination portion that 3D photographing is suitable.

8. The photographing equipment according to claim 7, wherein the display controlling portion displays a representation indicating that 3D photographing is not suitable on the display portion responsive to a determination by the object detecting portion that a reference object of a predetermined size or a larger size is not detected.

9. The photographing equipment according to claim 7, wherein the object detecting portion detects a reference object which is within a predetermined distance from the image pickup portion and is of a predetermined size or a larger size within the image pickup range of the image pickup portion among the objects in the image acquired by the image pickup portion.

10. The photographing equipment according to claim 7, wherein the object detecting portion detects, on the basis of a distribution of distances at the plurality of detection points, that there is a reference object of a predetermined size or a larger size within the image pickup range of the image pickup portion.

11. The photographing equipment according to claim 9, wherein the object detecting portion sets the plurality of detection points in a predetermined area at a lower part of the photographing range of the image pickup portion and detects, on the basis of a distribution of distances at the plurality of detection points, that there is a reference object which is within a predetermined distance from the image pickup portion and is of a predetermined size or a larger size within the image pickup range of the image pickup portion.

12. The photographing equipment according to claim 7, wherein the display controlling portion displays a representation not recommending 3D photographing on the display portion responsive to a determination by the object detecting portion that the reference object is not detected, or that there are a plurality of objects whose positions within the image pickup range and whose distances from the image pickup portion do not have a correlation among the objects in the image acquired by the image pickup portion.

13. The photographing equipment according to claim 9, wherein the display controlling portion displays a representation not recommending 3D photographing on the display portion responsive to a determination by the object detecting portion that the reference object is not detected, or that there are a plurality of objects whose positions within the image pickup range and whose distances from the image pickup portion do not have a correlation among the objects in the image acquired by the image pickup portion.

14. The photographing equipment according to claim 12, wherein the display controlling portion displays a representation not recommending 3D photographing on the display portion responsive to a determination that there are not a plurality of objects within the image pickup range whose distance from the image pickup portion increases as the distance from the reference object increases.

15. The photographing equipment according to claim 13, wherein the display controlling portion displays a representation not recommending 3D photographing on the display portion responsive to a determination that there are not a plurality of objects within the image pickup range whose distance from the image pickup portion increases as the distance from the reference object increases.

16. The photographing equipment according to claim 1, wherein the display controlling portion highlights the reference object as the representation indicating that 3D photographing is suitable.

17. The photographing equipment according to claim 4, wherein the display controlling portion highlights the reference object as the representation indicating that 3D photographing is suitable.

18. The photographing equipment according to claim 7, wherein the display controlling portion highlights the reference object when the representation recommending 3D photographing would be displayed.

19. A method comprising:
acquiring an image using an image pickup portion;
displaying the image acquired by the image pickup means;
obtaining a distribution of distances from the image pickup portion to objects in the image acquired by the image pickup portion;
setting a plurality of detection points within a photographing range of the image pickup portion;
determining whether 3D photographing is suitable based on whether or not a position of each of the detection points is substantially linearly arranged on a two-dimensional plane and distances to objects corresponding to the detection points have a correlation with each other; and
displaying a representation indicating that 3D photographing is suitable responsive to a determination that 3D photographing is suitable, and otherwise not displaying the representation indicating that 3D photographing is suitable responsive to a determination that 3D photographing is not suitable.

20. A method comprising:
acquiring an image using an image pickup portion;
displaying the image acquired by the image pickup portion;
determining whether a reference object of a predetermined size or a larger size is detected among objects in the image acquired by the image pickup portion within an image pickup range of the image pickup portion;
setting a plurality of detection points within a photographing range of the image pickup portion;
determining whether 3D photographing is suitable based on whether or not a position of each of the detection points is substantially linearly arranged on a two-dimensional plane and distances to objects corresponding to the detection points have a correlation with each other; and
displaying a representation recommending 3D photographing on the display means responsive to a determination that a reference object of a predetermined size or a larger size is detected and a further determination that 3D photographing is suitable.

* * * * *